United States Patent
Nishio (10) Patent No.: US 7,206,596 B2
(45) Date of Patent: Apr. 17, 2007

(54) COMMUNICATION TERMINAL APPARATUS, BASE STATION APPARATUS, AND TRANSMISSION POWER CONTROL METHOD

(75) Inventor: Akihiko Nishio, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 183 days.

(21) Appl. No.: 10/511,727

(22) PCT Filed: Aug. 15, 2003

(86) PCT No.: PCT/JP03/10368

§ 371 (c)(1),
(2), (4) Date: Oct. 19, 2004

(87) PCT Pub. No.: WO2004/019519

PCT Pub. Date: Mar. 4, 2004

(65) Prior Publication Data

US 2005/0239467 A1 Oct. 27, 2005

(30) Foreign Application Priority Data

Aug. 20, 2002 (JP) ............................. 2002-239744

(51) Int. Cl.
*H04B 7/00* (2006.01)
*H04Q 7/20* (2006.01)
*H04Q 7/00* (2006.01)
(52) U.S. Cl. ...................... 455/522; 455/442; 455/436; 370/332
(58) Field of Classification Search ................ 455/522, 455/442, 436; 370/332
See application file for complete search history.

(56) References Cited

U.S. PATENT DOCUMENTS 6,263,205 B1 * 7/2001 Yamaura et al. ............. 455/442
6,714,788 B2 * 3/2004 Voyer .......................... 455/453

(Continued)

FOREIGN PATENT DOCUMENTS

EP          1113593        *   7/2001

(Continued)

OTHER PUBLICATIONS

International Search Report dated Dec. 9, 2003.

(Continued)

*Primary Examiner*—Edan Orgad
*Assistant Examiner*—Bobbak Safaipour
(74) *Attorney, Agent, or Firm*—Stevens, Davis, Miller & Mosher, LLP (57) ABSTRACT

In a wireless communication system operating in a mixed channel environment involving A-DPCH (Associated—Dedicated Physical CHannel) to which soft handover applies and HS-DPCCH (High Speed—Dedicated Physical Control CHannel) to which hard handover applies, in order to keep the received SIR of HS-DPCCH at the required SIR by performing transmission power control for HS-DPCCH appropriately, HO judgment section 30 judges whether A-DPCH is in a soft handover state or not, transmission radio section 42 sets the transmission power of HS-DPCCH into a power equal to the transmission power of A-DPCH when A-DPCH is not in a soft handover state, whereas the transmission power of HS-DPCCH is set at an addition of the transmission power of A-DPCH and an offset when A-DPCH is in a soft handover state.

3 Claims, 10 Drawing Sheets

U.S. PATENT DOCUMENTS

| | | | |
|---|---|---|---|
| 6,760,587 B2* | 7/2004 | Holtzman et al. | 455/436 |
| 6,961,582 B2* | 11/2005 | Su et al. | 455/522 |
| 6,999,784 B1* | 2/2006 | Choi | 455/522 |
| 7,027,828 B2* | 4/2006 | Kim et al. | 455/522 |
| 7,058,035 B2* | 6/2006 | English | 370/332 |
| 2002/0055367 A1* | 5/2002 | Hamabe et al. | 455/522 |
| 2002/0061764 A1* | 5/2002 | Kim et al. | 455/522 |
| 2002/0115467 A1* | 8/2002 | Hamabe | 455/522 |
| 2002/0160783 A1* | 10/2002 | Holtzman et al. | 455/452 |
| 2002/0160798 A1* | 10/2002 | Shoji et al. | 455/522 |
| 2003/0231612 A1* | 12/2003 | Kim et al. | 370/342 |
| 2004/0029534 A1* | 2/2004 | Odenwalder | 455/67.11 |
| 2004/0110524 A1* | 6/2004 | Takano et al. | 455/522 |
| 2005/0043051 A1* | 2/2005 | Takano et al. | 455/522 |
| 2005/0075124 A1* | 4/2005 | Willenegger et al. | 455/522 |
| 2005/0186981 A1* | 8/2005 | Nishio | 455/522 |
| 2005/0277419 A1* | 12/2005 | Takano et al. | 455/442 |
| 2006/0045046 A1* | 3/2006 | Kim et al. | 370/329 |

FOREIGN PATENT DOCUMENTS

| | | |
|---|---|---|
| JP | 2002198903 | 7/2002 |
| JP | 2002325063 | 11/2002 |

OTHER PUBLICATIONS

3GPP TR 25.841. V4.1.0, Apr. 4, 2001.

* cited by examiner

FIG.10

COMMUNICATION TERMINAL APPARATUS, BASE STATION APPARATUS, AND TRANSMISSION POWER CONTROL METHOD

FIELD OF THE INVENTION

The present invention relates to a communication terminal apparatus, a base station apparatus, and a transmission power control method.

BACKGROUND ART

In the field of wireless communication systems, HSDPA (High Speed Downlink Packet Access) has been proposed, which allows a plurality of communication terminals to share a high-rate and large-capacity downlink channel to perform high-rate packet transmission via the downlink channel. In addition, these days, a technique for speeding up the packet transmission rate on an uplink channel has been under study (such a technique is referred to as Fast-UL (Fast—Uplink) herein). In HSDPA, a plurality of channels is used, including HS-PDSCH (High Speed—Physical Downlink Shared CHannel), A-DPCH (Associated—Dedicated Physical CHannel), HS-DPCCH (High Speed Dedicated Physical Control CHannel), etc. Likewise, Fast-UL is expected to involve a plurality of channels such as HS-PUSCH (High Speed—Physical Uplink Shared CHannel), A-DPCH, HS-DPCCH, and so on.

HS-PDSCH is a downlink shared channel used for packet transmission. HS-PUSCH is an uplink shared channel used for packet transmission. Accompanying a shared channel, A-DPCH, which is a dedicated associated channel on uplink and downlink, transports pilot signals, TPC (Transmission Power Control) commands, control signals for keeping a communication link, etc. HS-DPCCH is a dedicated control channel in uplink and downlink, over which signals for controlling a shared channel such an ACK signal or a NACK signal, and a CQI (Channel Quality Indicator) signal, etc. are transmitted. Incidentally, an ACK signal is a signal indicating that a high-rate packet which had been transmitted from a base station or from a communication terminal was correctly demodulated at a communication terminal or at a base station, whereas a NACK signal is a signal indicating that a high-rate packet which had been transmitted from a base station or from a communication terminal was erroneously demodulated at a communication terminal or at a base station. Additionally, CQI is a signal which is generated based on channel quality, indicating a combination of, for example, a packet modulation scheme, a block size, a transmission power adjustment value, and so forth. In HSDPA, a communication terminal notifies its communicating party about a packet modulation scheme, a block size, a transmission power adjustment value, etc., as desired by the communication terminal, by using such a CQI. Although CQI is a signal which is generated based on channel quality also under Fast-UL, its specific contents have not been fixed yet.

Incidentally, in Fast-UL, channels are provided on both uplink and downlink for both A-DPCH and HS-DPCCH, where CQI is transmitted via an uplink HS-DPCCH whereas an ACK/NACK signal is transmitted via a downlink HS-DPCCH. In contrast, according to HSDPA, though channels are provided on both uplink and downlink for A-DPCH, an uplink channel only is provided for HS-DPCCH, where CQI and an ACK/NACK signal is transmitted on an uplink HS-DPCCH. Soft handover (SHO) is employed in A-DPCH.

In contrast, HS-PDSCH, HS-PUSCH, and HS-DPCCH are subjected to hard handover (HHO), which means that HS-PDSCH, HS-PUSCH, and HS-DPCCH are always connected to a single base station only. Moreover, the timing for executing HHO on HS-PDSCH and HS-PUSCH is the same as the HHO timing of HS-DPCCH.

Figure 1:
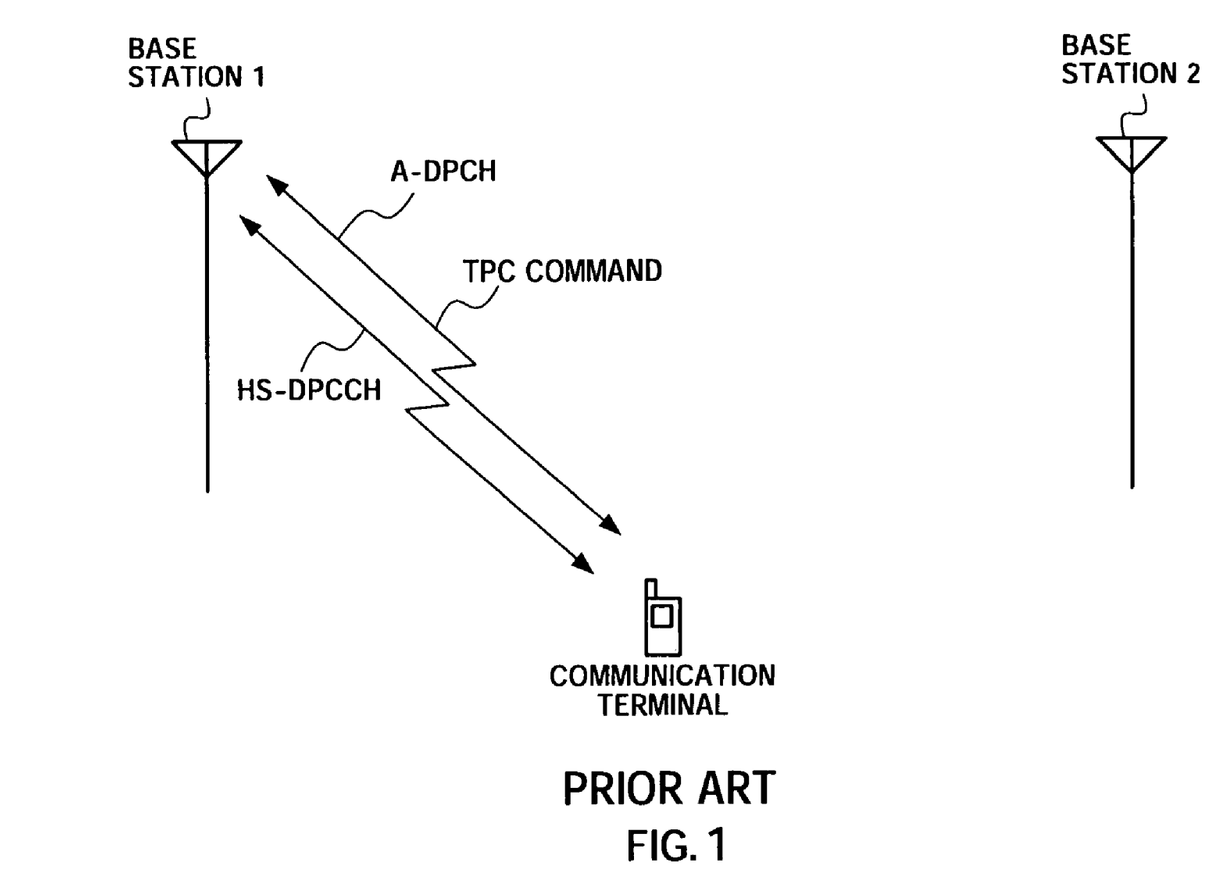
FIG. 1 is a diagram for illustration of a conventional transmission power control when A-DPCH is not in SHO.
Figure 2:
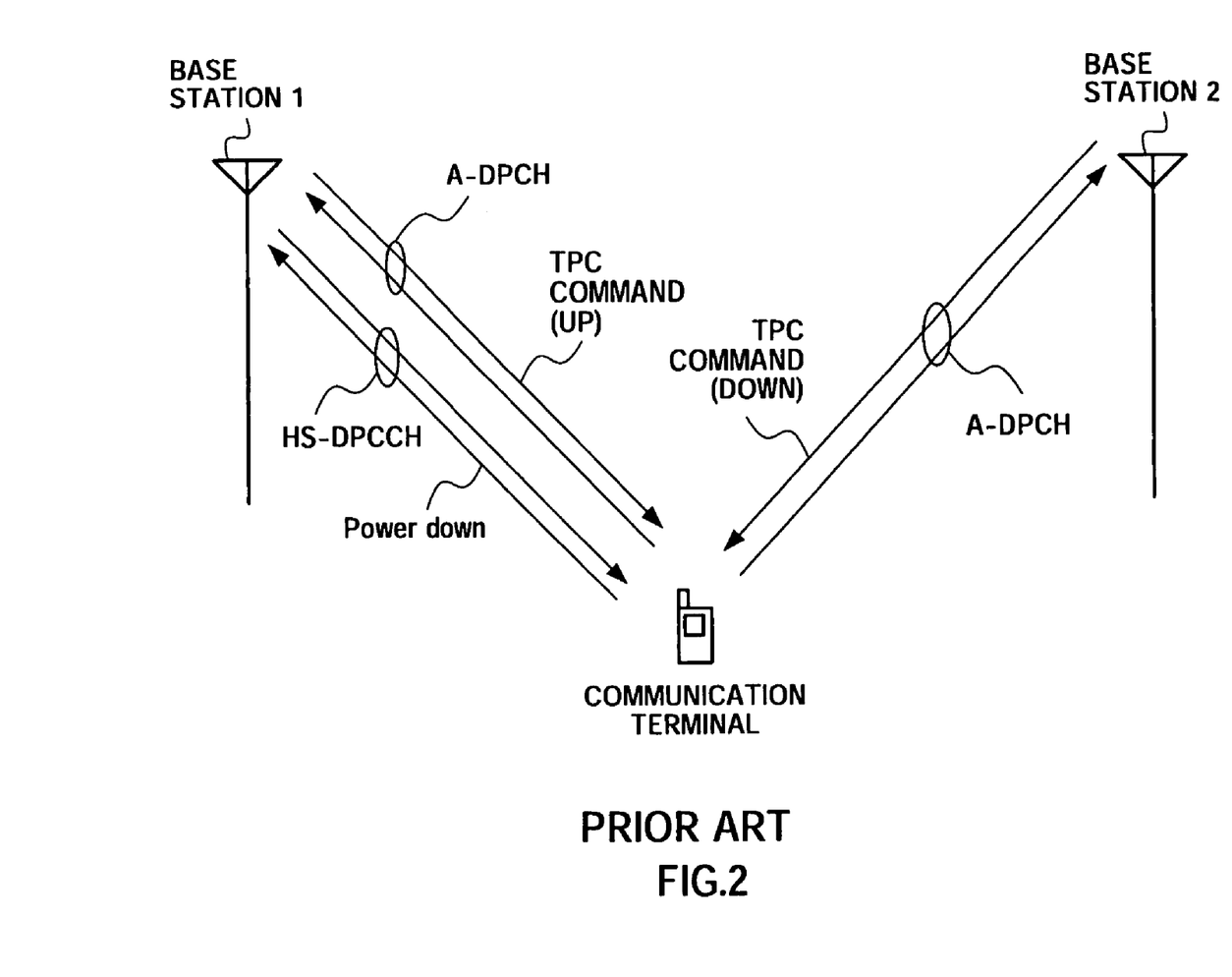
FIG. 2 is a diagram for illustration of a conventional uplink transmission power control for HS-DPCCH.
Figure 3:
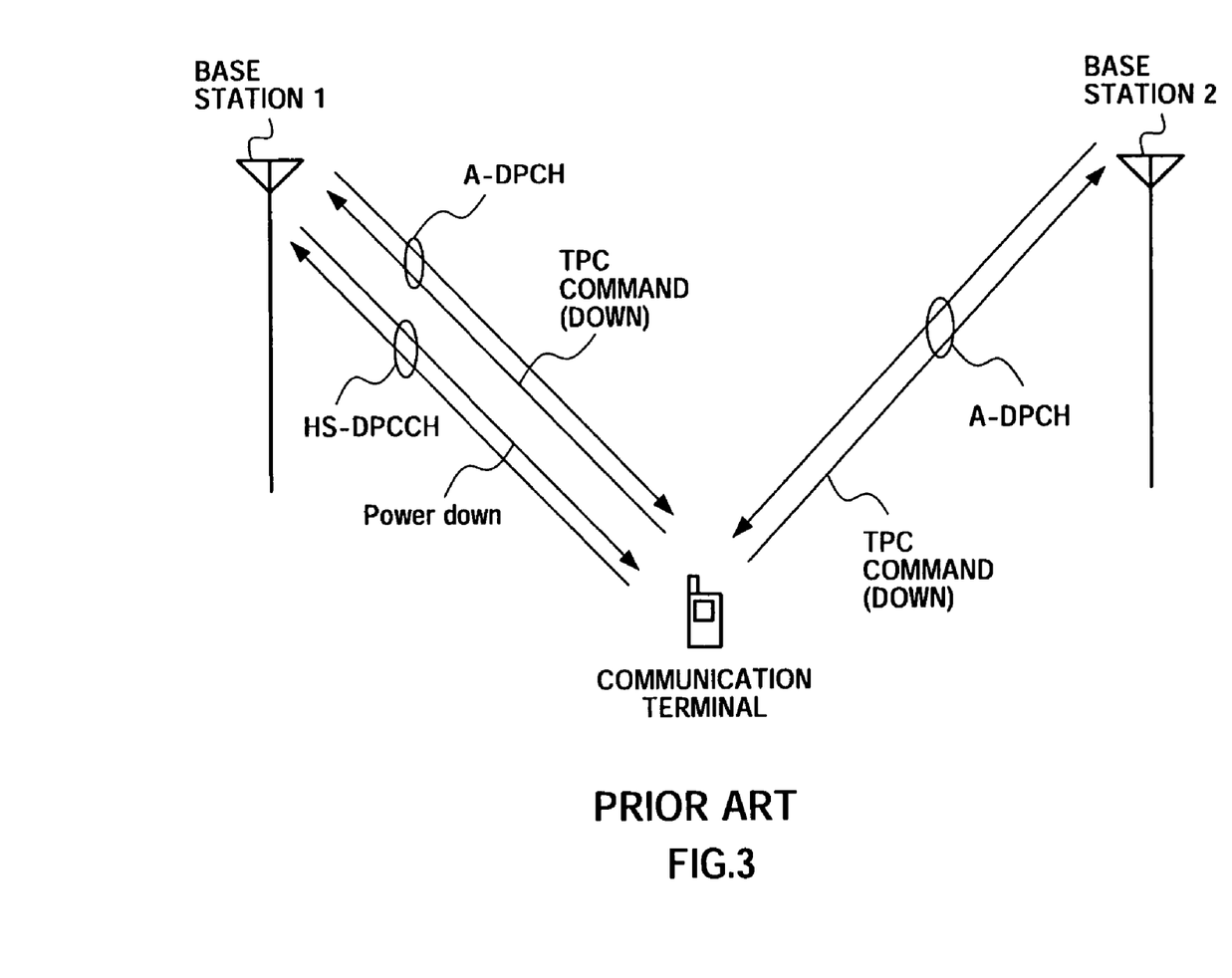
FIG. 3 is a diagram for illustration of a conventional downlink transmission power control for HS-DPCCH.

With reference to FIG. 1 through FIG. 3, transmission power control for HS-DPCCH is explained below, taking an example of Fast-UL. FIG. 1 illustrates a situation where A-DPCH is not under SHO, while FIG. 2 and FIG. 3 show a state in which A-DPCH is under SHO. Here, the state where A-DPCH is not under SHO means a situation in which a communication terminal has an A-DPCH connection to a single base station only, whereas the state where A-DPCH is under SHO means a situation in which a communication terminal has A-DPCH connections to a plurality of base stations.

As illustrated in FIG. 1, the transmission power of A-DPCH is controlled under a well-known practice of a closed loop transmission power control in accordance with TPC commands so that the reception SIR of A-DPCH is kept at the target SIR thereof. On the other hand, as for HS-DPCCH, transmission power control is performed in accordance with A-DPCH TPC commands in a similar manner as done for A-DPCH. This ensures that the received SIR of HS-DPCCH meets the required SIR when A-DPCH is not under SHO.

As a communication terminal moves toward base station 2 from base station 1, the communication terminal establishes connections to base station 2 as well as base station 1, which puts A-DPCH in SHO conditions. Then, the transmission power control of HS-DPCCH, to which HHO applies, is performed in the following way when A-DPCH is under SHO.

First, transmission power control of uplink HS-DPCCH is explained with reference to FIG. 2. When A-DPCH enters into SHO, both of base station 1 and base station 2 receives A-DPCH signals transmitted from the communication terminal. Base station 1 generates a TPC command so as to make the reception SIR at BS 1 approaches the target SIR, and transmits the generated command to the communication terminal. Base station 2 generates a TPC command so as to make the reception SIR at BS 2 approaches the target SIR, and transmits the generated command to the communication terminal. The communication terminal increases transmission power of A-DPCH if all of a plurality of the received TPC commands is TPC commands for instructing to increase transmission power, while the communication terminal decreases transmission power of A-DPCH if any one of the plurality of the received TPC commands are a TPC command for instructing to decrease transmission power. Accordingly, in a case where a TPC command for instruction of increasing transmission power is transmitted from base station 1 whereas another TPC command for instruction of decreasing transmission power is transmitted from base station 2, the communication terminal decreases the transmission power of an A-DPCH signal. Because the transmission power of HS-DPCCH is controlled in the same way as the transmission power of A-DPCH, as illustrated in FIG. 2, the transmission power of an HS-DPCCH signal is also decreased in accordance with the decreasing of the transmission power of an A-DPCH signal.

Here, regarding the uplink A-DPCH, an A-DPCH signal received at base station 1 and an A-DPCH signal received at base station 2 are subjected to selective combination at a control station. For this reason, even in a case where the transmission power of A-DPCH is decreased as described above, no particular problem arises because the SIR of the uplink A-DPCH meets the required SIR at the control station.

In contrast, as for HS-DPCCH to which HHO applies, a connection is made to either one of the base stations only even when A-DPCH is in SHO. For this reason, when the transmission power of the uplink HS-DPCCH is decreased in accordance with the decreasing of the transmission power of the uplink A-DPCH as described above, it is possible that the SIR of the uplink HS-DPCCH fails to meet the required SIR.

Next, transmission power control of downlink HS-DPCCH is explained with reference to FIG. 3. When A-DPCH enters into SHO, a communication terminal receives A-DPCH signals transmitted from both of base station 1 and base station 2. Combining the A-DPCH signal transmitted from base station 1 and the A-DPCH signal transmitted from base station 2, the communication terminal generates a TPC command in such a manner that the reception SIR of the combined signal approaches the target SIR. Then, the communication terminal transmits the identical TPC commands respectively to base station 1 and base station 2.

Here, even when the reception SIR falls short of the target SIR at the communication terminal only with the A-DPCH signal transmitted from base station 1, as illustrated in FIG. 3, a TPC command for instructing the decreasing of transmission power is transmitted if the reception SIR of the combined signal equals to or exceeds the target SIR. Because the transmission power of HS-DPCCH is controlled in the same way as the transmission power of A-DPCH, as illustrated in FIG. 3, at base station 1, the transmission power of an HS-DPCCH signal is also decreased in accordance with the decreasing of the transmission power of an A-DPCH signal as per the TPC command.

As for HS-DPCCH to which HHO applies, a connection is made to either one of the base stations only even when A-DPCH is in SHO. For this reason, when the transmission power of the downlink HS-DPCCH is decreased in accordance with the decreasing of the transmission power of the downlink A-DPCH as described above, at the communication terminal, it is possible that the SIR of the downlink HS-DPCCH fails to meet the required SIR.

It is noted that this problem arises similarly in HSDPA, too, not only in Fast-UL.

DISCLOSURE OF THE INVENTION

It is an object of the present invention to provide a communication terminal apparatus, a base station apparatus, and a transmission power control method which makes it possible to keep the received SIR of HS-DPCCH at the required SIR, which is achieved by performing transmission power control for HS-DPCCH appropriately in a wireless communication system operating in a mixed channel environment involving an SHO-applicable A-DPCH and an HHO-applicable HS-DPCCH.

In order to solve the above problem and to achieve the object, under a wireless communication system where an SHO-applicable A-DPCH and an HHO-applicable HS-DPCCH exist, the present invention is devised as characterized in that the transmission power of HS-DPCCH is set into a power equal to the transmission power of A-DPCH when A-DPCH is not in SHO, whereas the transmission power of HS-DPCCH is set at an addition of the transmission power of A-DPCH and an offset notified via HS-DPCCH when A-DPCH is in SHO.

With this feature, it is possible to perform transmission power control for HS-DPCCH suitably in a wireless communication system under a mixed channel environment involving an SHO-applicable A-DPCH and an HHO-applicable HS-DPCCH, even when A-DPCH is under SHO.

BEST MODE FOR CARRYING OUT THE INVENTION

Figure 4:
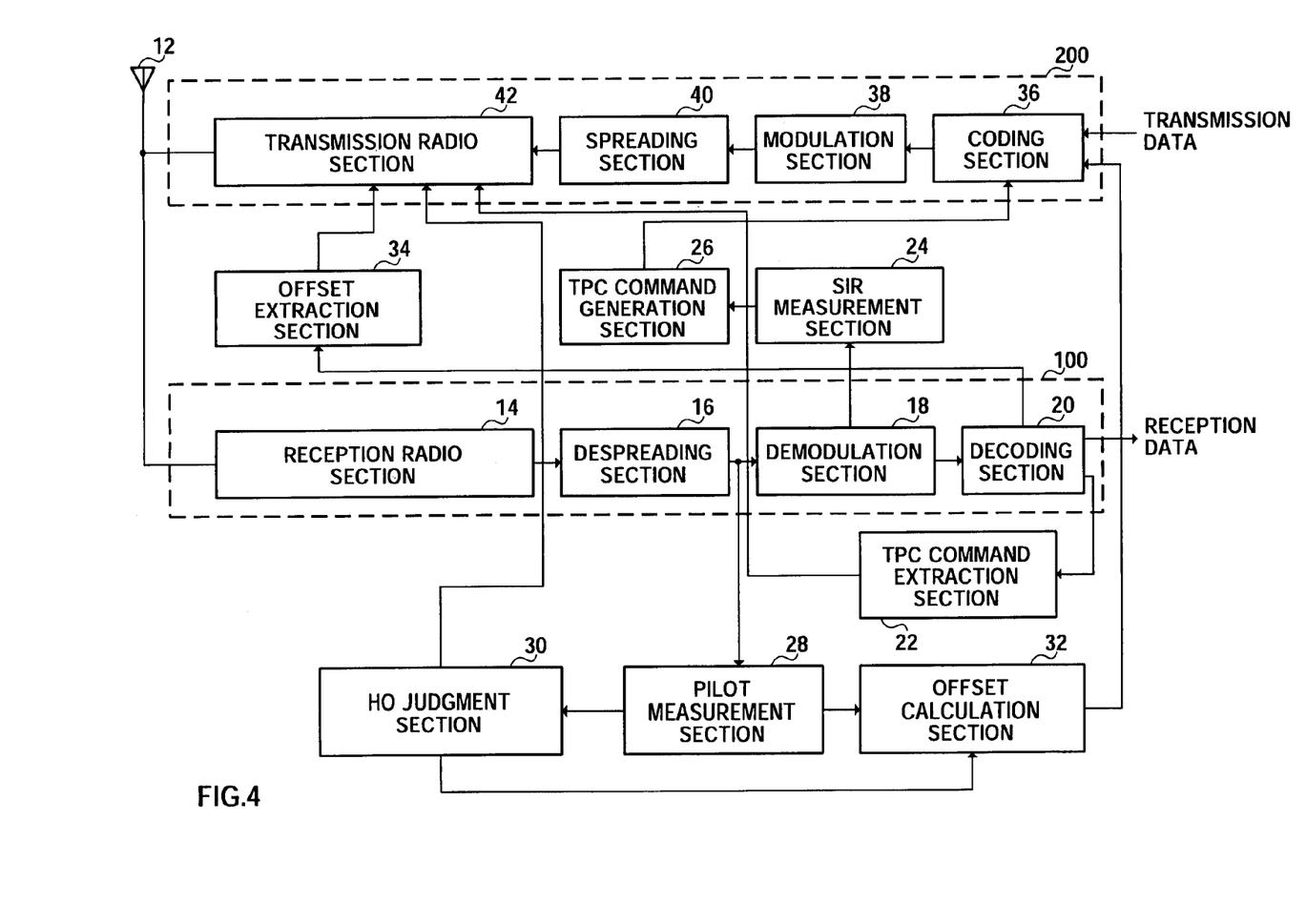
FIG. 4 is a block diagram illustrating the configuration of a communication terminal apparatus according to an embodiment of the present invention.

An embodiment of the present invention will be described below. FIG. 4 is a block diagram illustrating the configuration of a communication terminal apparatus according to an embodiment of the present invention. This communication terminal apparatus is intended to be used in a mobile communication system where Fast-UL and/or HSDPA is performed.

Reception section 100 comprises reception radio section 14, despreading section 16, demodulation section 18, and decoding section 20.

Reception radio section 14 performs processing such as down conversion, AGC (Automatic Gain Control), A/D conversion, etc., on signals received through antenna 12. This reception signal contains a TPC command for uplink A-DPCH, and an uplink HS-DPCCH transmission power offset relative to the transmission power of uplink A-DPCH. Incidentally, this TPC command is received from a base station via downlink A-DPCH, while this offset is received from the base station via downlink HS-DPCCH.

Despreading section 16 performs despreading processing on the reception signals with a spreading code which is individually assigned to each channel. Demodulation section 18 demodulates the despread signals such as QPSK signals and the like. The demodulated signals are inputted into decoding section 20 and SIR measurement section 24. Decoding section 20 performs error correction decoding and CRC (Cyclic Redundancy Check) on the demodulated reception signals to decode the reception signals. Such decoding produces reception data (bit sequence). The reception data is inputted into TPC command extraction section 22 and offset extraction section 34.

TPC command extraction section 22 extracts a TPC command for uplink A-DPCH which is accommodated in a time slot of the A-DPCH reception data. The extracted TPC command is inputted into transmission radio section 42.

The communication terminal continuously receives CPICH (Common PIlot CHannel) signals (CPICH 1), which are transmitted at a constant power from base station 1, and CPICH (Common PIlot CHannel) signals (CPICH 2), which are transmitted at a constant power from base station 2. As it is done so, pilot measurement section 28 measures the reception power of CPICH 1 and the reception power of CPICH 2. The measured reception powers are inputted into HO judgment section 30 and offset calculation section 32.

HO (Handover) judgment section 30 judges whether A-DPCH is in SHO or not, and inputs the judgment result into offset calculation section 32 and transmission radio section 42. As the communication terminal moves from base station 1 toward base station 2, A-DPCH enters an SHO state at the point in time when the difference between the reception power of CPICH 1 and the reception power of CPICH 2 reaches, for example, 3 dB. In this way, HO judgment section 30 is able to judge whether A-DPCH is in SHO or not, which is done by detecting the start of SHO and the end of SHO by monitoring the difference between the reception power of CPICH 1 and the reception power of CPICH 2. It is noted that it is possible to judge whether A-DPCH is in SHO or not in a similar way by having pilot measurement section 28 measure the reception SIR of CPICH signals and by having HO judgment section 30 monitor the difference between the reception SIR of CPICH 1 and the reception SIR of CPICH 2. Further alternatively, it is also possible to judge whether A-DPCH is in SHO or not according to a control signal sent from an upper layer, that is, a notice from a control station.

Offset calculation section 32 operates only when A-DPCH is under an SHO state, and offset calculation section 32 calculates a downlink HS-DPCCH transmission power offset relative to the transmission power of downlink A-DPCH, where such an offset is used at the base station. Then, offset calculation section 32 inputs the calculated offset into coding section 36 in order to notify it via uplink HS-DPCCH. Therefore, the offset calculated at offset calculation section 32 is transmitted to the base station via uplink HS-DPCCH only when A-DPCH is in SHO.

Figure 5:
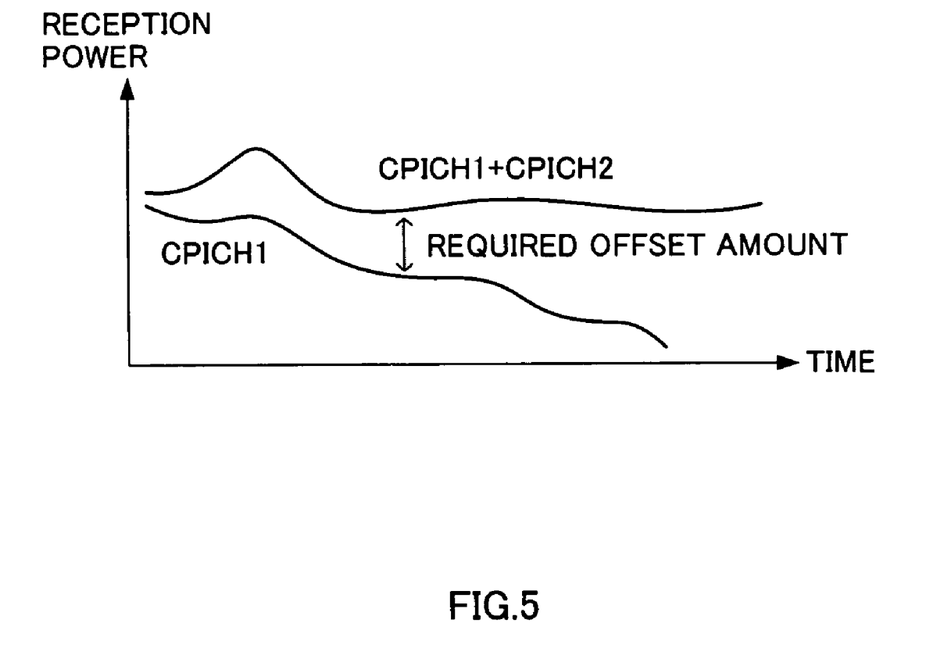
FIG. 5 is a diagram illustrating the progression pattern of required offset amount on a downlink channel according to an embodiment of the present invention.

At offset calculation section 32, the offset is calculated in the following way. Assuming that the reception power of CPICH 1 is P1 and the reception power of CPICH 2 is P2, an offset $\Delta P_{down}$ is calculated as: $\Delta P_{down}=(P1+P2)/P1$ ... (1), where P1, P2, and $\Delta P_{down}$ are true values in dB. When A-DPCH is in SHO, this offset $\Delta P_{down}$ is notified via uplink HS-DPCCH to the base station with which HS-DPCCH connection is held. The reason why the offset $\Delta P_{down}$ is calculated in this way is as follows: that is, when A-DPCH is in an SHO state whereas HS-DPCCH is in a state before HHO, A-DPCH connection is held with both of base station 1 and base station 2, while in contrast, HS-DPCCH connection is held with base station 1 only. Under such connection, in order to ensure the reception at the communication terminal of an HS-DPCCH signal transmitted from base station 1 only with a power of P1+P2, it follows that a power (P1+P2)/P1 times as high as that of an A-DPCH signal is required. Incidentally, the progression pattern of required offset amount on a downlink channel is illustrated in FIG. 5.

Alternatively, it may be so configured that pilot measurement section 28 measures the reception SIR of CPICH signals and offset calculation section 32 calculates the offset amount $\Delta P_{down}$ according to the above equation (1), taking the reception SIR of CPICH 1 as P1 and the reception SIR of CPICH 2 as P2.

SIR measurement section 24 measures SIR of A-DPCH reception signals. The measured SIR is inputted into TPC command generation section 26.

Comparing the A-DPCH reception SIR with the target SIR thereof, TPC command generation section 26 generates a TPC command for downlink A-DPCH in accordance with the result of the comparison. If the measured SIR equals to or exceeds the target SIR, a TPC command instructing the decrease in transmission power (Down) is generated; a TPC command instructing the increase in transmission power (Up) is generated if the measured SIR is less than the target SIR. The generated TPC command is inputted into coding section 36.

Offset extraction section 34 extracts an offset accommodated in HS-DPCCH reception data (uplink HS-DPCCH transmission power offset relative to the transmission power of uplink A-DPCH). The extracted offset is inputted into transmission radio section 42.

Transmission section 200 comprises coding section 36, modulation section 38, spreading section 40, and transmission radio section 42.

Coding section 36 performs convolution coding and CRC coding on transmission data (bit sequence) to encode the transmission data, thereby configuring a transmission frame made up of a plurality of time slots. When configuring a frame, coding section 36 embeds a TPC command for downlink A-DPCH in an A-DPCH time slot, and embeds an offset for downlink HS-DPCCH in an HS-DPCCH time slot.

Modulation section 38 performs modulation processing such as QPSK on the transmission data. Spreading section 40 performs spreading processing on the modulated transmission signals with a spreading code which is individually assigned to each channel.

After performing processing such as D/A conversion, transmission power control, up conversion, etc., on the spread transmission signals, transmission radio section 42 transmits the signals via antenna 12. When making such transmission, transmission radio section 42 performs transmission power control in accordance with the judgment result at HO judgment section 30.

When it is judged at HO judgment section 30 that A-DPCH is not in SHO, transmission radio section 42 controls the transmission power of uplink A-DPCH in accordance with the TPC command for A-DPCH, and in addition to that, transmission radio section 42 sets the transmission power of uplink HS-DPCCH into a power equal to the transmission power of uplink A-DPCH.

On the other hand, when it is judged at HO judgment section 30 that A-DPCH is in SHO, transmission radio section 42 controls the transmission power of uplink A-DPCH in accordance with the TPC command for A-DPCH, and in addition to that, transmission radio section 42 sets the transmission power of uplink HS-DPCCH at an addition of the transmission power of uplink A-DPCH and the offset extracted at offset extraction section 34.

Figure 6:
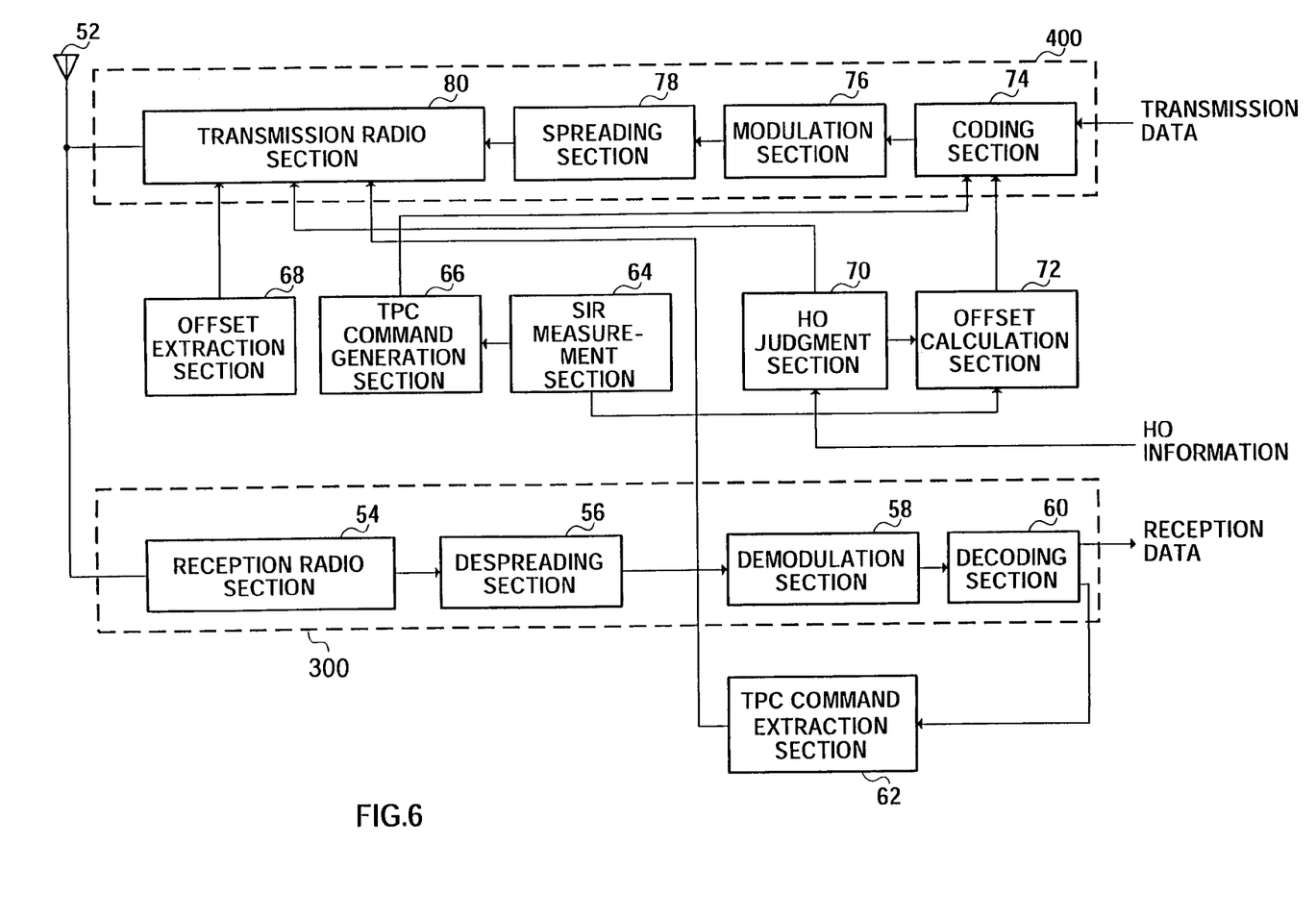
FIG. 6 is a block diagram illustrating the configuration of a base station apparatus according to an embodiment of the present invention.

Next, an explanation is given here on a base station apparatus which conducts wireless communication with the communication terminal apparatus described above. FIG. 6 is a block diagram illustrating the configuration of a base station apparatus according to an embodiment of the present invention. This base station apparatus is intended to be used in a mobile communication system where Fast-UL and/or HSDPA is performed.

Reception section 300 comprises reception radio section 54, despreading section 56, demodulation section 58, and decoding section 60.

Reception radio section 54 performs processing such as down conversion, AGC (Automatic Gain Control), A/D conversion, etc., on signals received through antenna 52. This reception signal contains a TPC command for downlink A-DPCH, and a downlink HS-DPCCH transmission power offset relative to the transmission power of downlink A-DPCH. Incidentally, this TPC command is received from a communication terminal via uplink A-DPCH, while this offset is received from the communication terminal via uplink HS-DPCCH.

Despreading section 56 performs despreading processing on the reception signals with a spreading code which is individually assigned to each channel. Demodulation section 58 demodulates the despread signals such as QPSK signals and the like. The demodulated signals are inputted into decoding section 60 and SIR measurement section 64. Decoding section 60 performs CRC and error correction decoding on the demodulated reception signals to decode the reception signals. Such decoding produces reception data (bit sequence). The reception data is inputted into TPC command extraction section 62 and offset extraction section 68.

TPC command extraction section 62 extracts a TPC command for downlink A-DPCH which is accommodated in a time slot of the A-DPCH reception data. The extracted TPC command is inputted into transmission radio section 80.

Offset extraction section 68 extracts an offset accommodated in a time slot of HS-DPCCH reception data (downlink HS-DPCCH transmission power offset relative to the transmission power of downlink A-DPCH). The extracted offset is inputted into transmission radio section 80.

SIR measurement section 64 measures SIR of A-DPCH reception signals. The measured SIR is inputted into TPC command generation section 66 and offset calculation section 72.

Comparing the A-DPCH reception SIR with the target SIR thereof, TPC command generation section 66 generates a TPC command for uplink A-DPCH based on the result of the comparison. If the measured SIR equals to or exceeds the target SIR, a TPC command instructing the decrease in transmission power (Down) is generated; a TPC command instructing the increase in transmission power (Up) is generated if the measured SIR is less than the target SIR. The generated TPC command is inputted into coding section 74.

HO judgment section 70 judges whether A-DPCH is in SHO or not, and inputs the judgment result into offset calculation section 72 and transmission radio section 80. Information notified from the control station apparatus for indicating whether A-DPCH is in SHO or not (HO information) is inputted into HO judgment section 70, and according to the HO information, HO judgment section 70 is able to judge whether A-DPCH is in SHO or not. The judgment result is inputted into offset calculation section 72.

Offset calculation section 72 operates only when A-DPCH is under an SHO state, and offset calculation section 72 calculates an uplink HS-DPCCH transmission power offset relative to the transmission power of uplink A-DPCH, where such an offset is used at the communication terminal. Then, offset calculation section 72 inputs the calculated offset into coding section 74 in order to notify it via downlink HS-DPCCH. Therefore, the offset calculated at offset calculation section 72 is transmitted to the communication terminal via downlink HS-DPCCH only when A-DPCH is in SHO.

Figure 7:
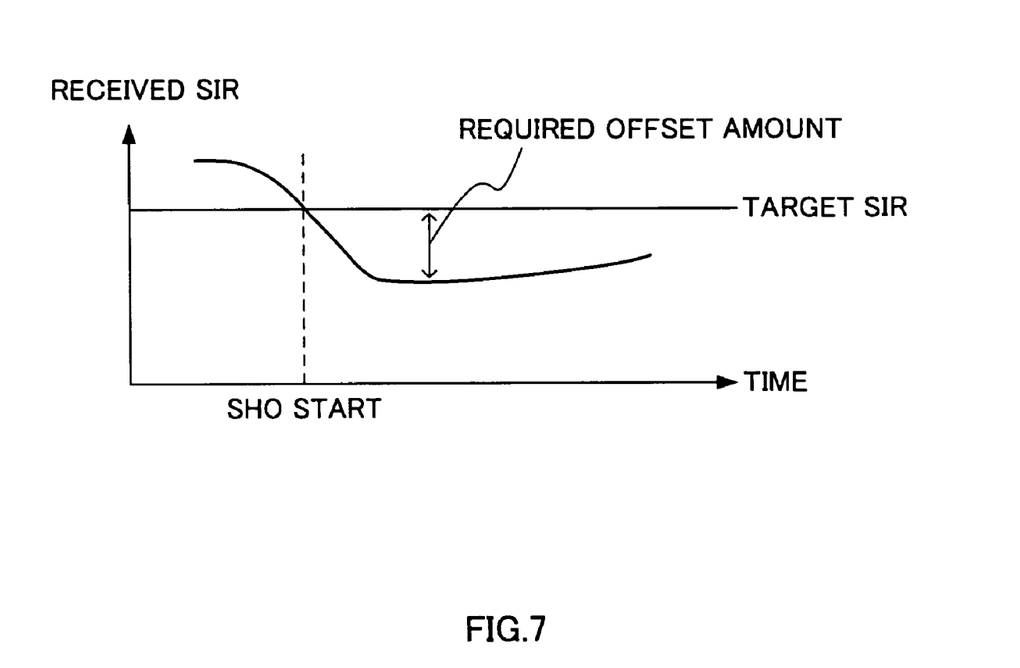
FIG. 7 is a diagram illustrating the progression pattern of required offset amount on an uplink channel according to an embodiment of the present invention.

At offset calculation section 72, the offset is calculated in the following way. Assuming that the reception SIR of A-DPCH is SIR1 and the target SIR thereof is SIR2, an offset $\Delta P_{up}$ is calculated as: $\Delta P_{up}$=SIR2−SIR1 ... (2), where SIR1, SIR2, and $\Delta P_{up}$ are in dB. When A-DPCH is in SHO, this offset $\Delta P_{up}$ is notified via downlink HS-DPCCH to the communication terminal. The reason why the offset $\Delta P_{up}$ is calculated in this way is as follows: that is, when A-DPCH is in an SHO state whereas HS-DPCCH is in a state before HHO, A-DPCH connection is held with both of base station 1 and base station 2, while in contrast, HS-DPCCH connection is held with base station 1 only. Under such connection, for HS-DPCCH where reception is done only at a single base station, it is because the offset $\Delta P_{up}$ indicates a required power to compensate a shortage for meeting the required SIR. Incidentally, the progression pattern of required offset amount on an uplink channel is illustrated in FIG. 7.

Transmission section 400 comprises coding section 74, modulation section 76, spreading section 78, and transmission radio section 80.

Coding section 74 performs CRC coding and convolution coding on transmission data (bit sequence) to encode the transmission data, thereby configuring a transmission frame made up of a plurality of time slots. When configuring a frame, coding section 74 embeds a TPC command for uplink A-DPCH in an A-DPCH time slot, and embeds an offset for uplink HS-DPCCH in an HS-DPCCH time slot.

Modulation section 76 performs modulation processing such as QPSK on the transmission data. Spreading section 78 performs spreading processing on the modulated transmission signals with a spreading code which is individually assigned to each channel.

After performing processing such as D/A conversion, transmission power control, up conversion, etc., on the spread transmission signals, transmission radio section 80 transmits the signals via antenna 52. When making such transmission, transmission radio section 80 performs transmission power control in accordance with the judgment result at HO judgment section 70.

When it is judged at HO judgment section 70 that A-DPCH is not in SHO, transmission radio section 80 controls the transmission power of downlink A-DPCH in accordance with the TPC command for A-DPCH, and in addition to that, transmission radio section 80 sets the transmission power of downlink HS-DPCCH into a power equal to the transmission power of downlink A-DPCH.

On the other hand, when it is judged at HO judgment section 70 that A-DPCH is in SHO, transmission radio section 80 controls the transmission power of downlink A-DPCH in accordance with the TPC command for A-DPCH, and in addition to that, transmission radio section 80 sets the transmission power of downlink HS-DPCCH at an addition of the transmission power of downlink A-DPCH and the offset extracted at offset extraction section 68.

Next, taking an example of Fast-UL, an explanation is given on the transmission power control of HS-DPCCH in the present embodiment. Here, an explanation on TPC of A-DPCH is omitted because the same technique as in a prior art applies.

When A-DPCH is not in SHO, the transmission power of HS-DPCCH is controlled into the same power as the transmission power of A-DPCH. This ensures that the received SIR of HS-DPCCH meets the required SIR when A-DPCH is not under SHO.

Figure 8:
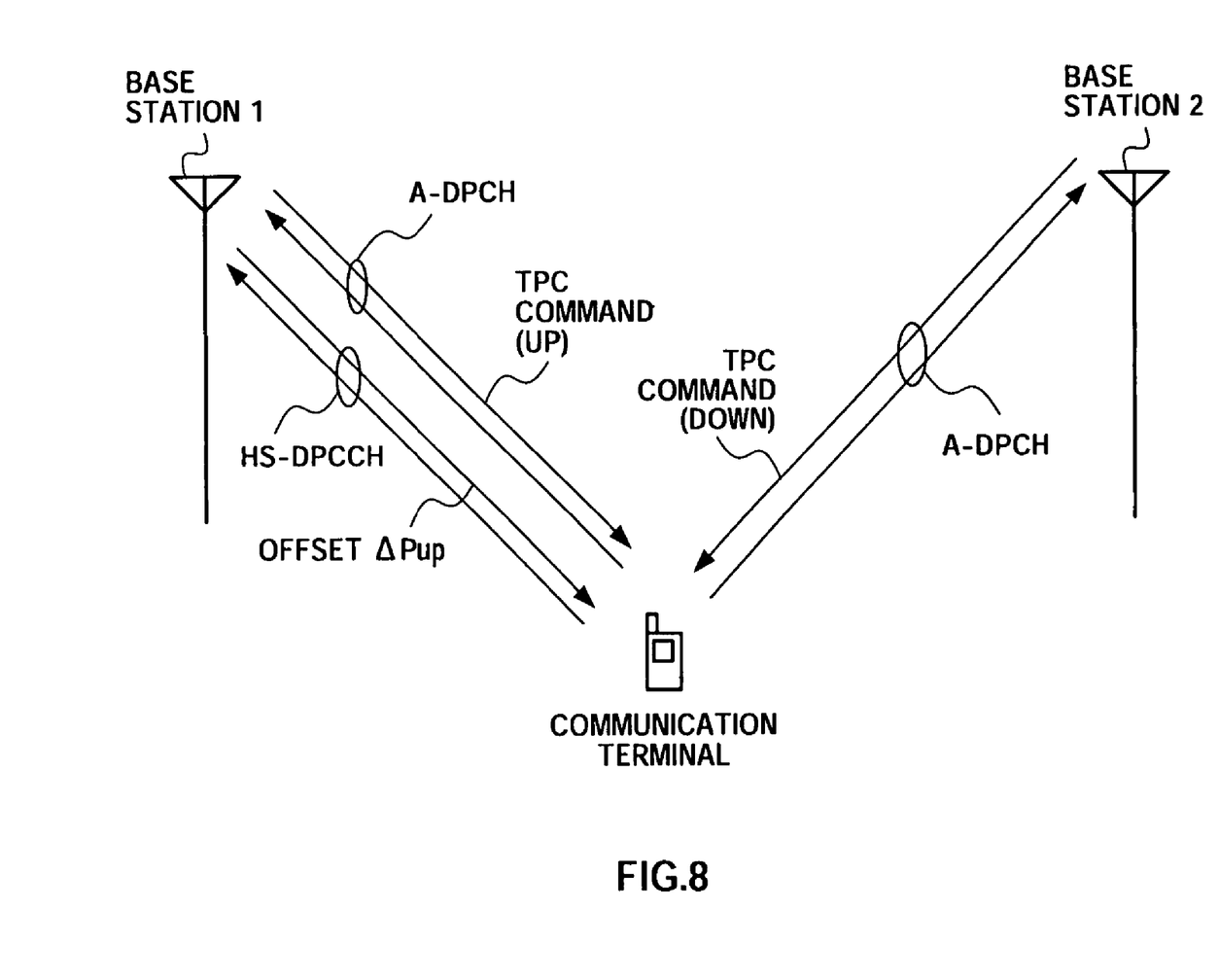
FIG. 8 is a diagram for illustration of uplink transmission power control for HS-DPCCH according to an embodiment of the present invention.
Figure 9:
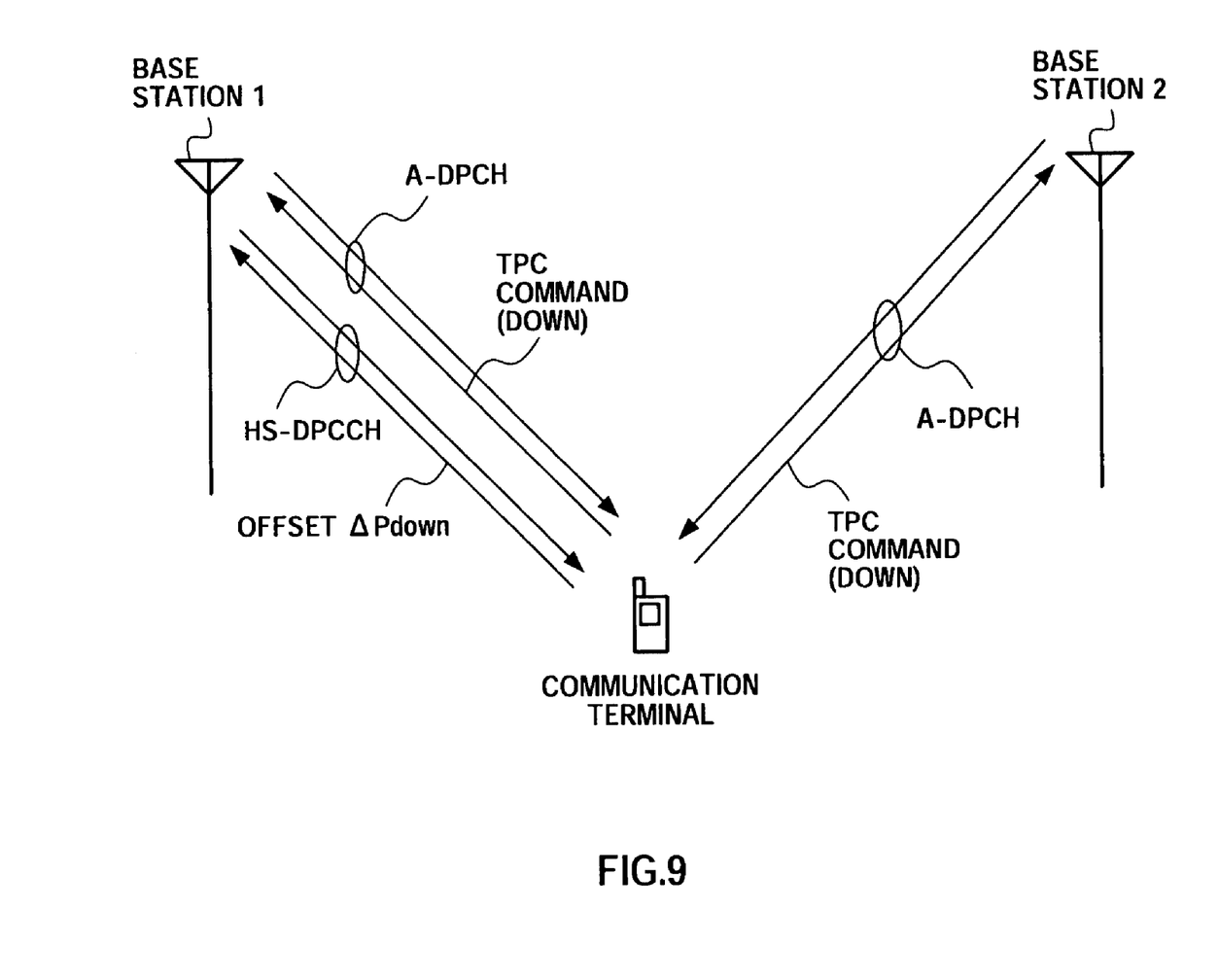
FIG. 9 is a diagram for illustration of downlink transmission power control for HS-DPCCH according to an embodiment of the present invention.

On the other hand, when A-DPCH is under SHO, the transmission power of HS-DPCCH, to which HHO applies, is controlled into an addition of the transmission power of A-DPCH and an offset. FIG. 8 and FIG. 9 illustrate a situation where A-DPCH is under SHO.

First, transmission power control of uplink HS-DPCCH is explained with reference to FIG. 8. When A-DPCH enters an SHO state, base station 1 starts the transmission of offsets $\Delta P_{up}$ for uplink HS-DPCCH via downlink HS-DPCCH to a communication terminal. The communication terminal controls the transmission power of uplink HS-DPCCH into an addition of the transmission power of uplink A-DPCH and the offset $\Delta P_{up}$.

For example, as illustrated in FIG. 8, as for A-DPCH, in a case where a TPC command for instruction of increasing transmission power is transmitted from base station 1 whereas another TPC command for instruction of decreasing transmission power is transmitted from base station 2, the communication terminal decreases the transmission power of an A-DPCH signal. When A-DPCH is in SHO, the offsets $\Delta P_{up}$ as well as TPC commands for A-DPCH are transmitted from base station 1 to the communication terminal. Then, the communication terminal controls the transmission power of an HS-DPCCH signal, which is transmitted to base station 1, into an addition of the transmission power of an A-DPCH signal and the offset $\Delta P_{up}$. By doing so, even when A-DPCH is in SHO, the transmission power of HS-DPCCH is controlled appropriately, which makes it possible to keep the received SIR of HS-DPCCH at the required SIR thereof at the base station with which HS-DPCCH connection is held.

Next, transmission power control of downlink HS-DPCCH is explained with reference to FIG. 9. When A-DPCH enters an SHO state, a communication terminal starts the transmission of offsets $\Delta P_{down}$ for downlink HS-DPCCH via uplink HS-DPCCH to base station 1. Base station 1 controls the transmission power of downlink HS-DPCCH into an addition of the transmission power of downlink A-DPCH and the offset $\Delta P_{down}$.

For example, as illustrated in FIG. 9, regarding A-DPCH, the communication terminal combines the A-DPCH signal transmitted from base station 1 and the A-DPCH signal transmitted from base station 2, and the communication terminal generates a TPC command in such a manner that the reception SIR of the combined signal approaches the target SIR. Then, the communication terminal sends the identical TPC commands respectively to base station 1 and base station 2. In the example of FIG. 9, TPC commands for instructing the decreasing of transmission power are sent to the both stations. In accordance with the TPC command, base station 1 and base station 2 decrease the transmission power of downlink A-DPCH respectively. When A-DPCH is in SHO, the offsets $\Delta P_{down}$ as well as TPC commands for A-DPCH are transmitted from the communication terminal to base station 1. Then, base station 1 controls the transmission power of an HS-DPCCH signal, which is transmitted to the communication terminal, into a power of the transmission power of an A-DPCH signal, which is also transmitted to the communication terminal, plus the offset $\Delta P_{down}$. By doing so, even when A-DPCH is in SHO, the transmission power of HS-DPCCH is controlled appropriately, which makes it possible to keep the received SIR of HS-DPCCH at the required SIR thereof at the communication terminal.

Figure 10:
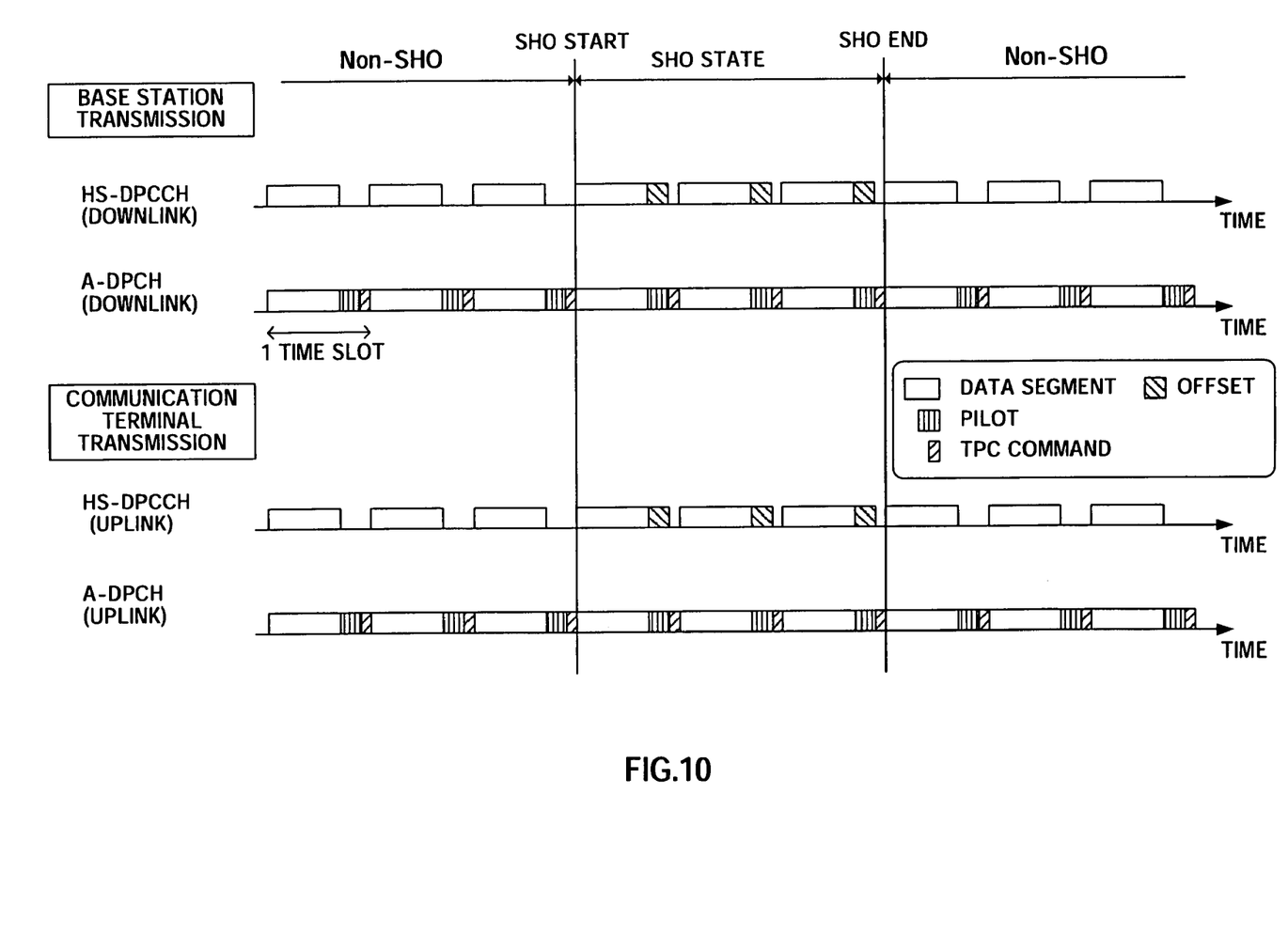
FIG. 10 is a diagram for illustrating the timing of starting/ending the transmission of offsets for HS-DPCCH according to an embodiment of the present invention.

Next, with reference to FIG. 10, an explanation is given here on the transmission start timing of offsets for HS-DPCCH and the transmission end timing thereof.

As for downlink A-DPCH, regardless of whether A-DPCH is in SHO or not, a TPC command to be used for the transmission power control of uplink A-DPCH and a pilot to be used for the SIR measurement of downlink A-DPCH is transmitted from a base station to a communication terminal on a time slot by time slot basis. Likewise, as for uplink A-DPCH, regardless of whether A-DPCH is in SHO or not, a TPC command to be used for the transmission power control of downlink A-DPCH and a pilot to be used for the SIR measurement of uplink A-DPCH is transmitted from a communication terminal to a base station on a time slot by time slot basis.

On the other hand, as for downlink HS-DPCCH, an offset $\Delta P_{up}$ to be used for the transmission power control of uplink HS-DPCCH is transmitted from a base station to a communication terminal on a time slot by time slot basis only when A-DPCH is in SHO. Meanwhile, regarding uplink HS-DPCCH, an offset $\Delta P_{down}$ to be used for the transmission power control of downlink HS-DPCCH is transmitted from a communication terminal to a base station on a time slot by time slot basis only when A-DPCH is in SHO, where such an offset is transmitted together with CQI. Incidentally, CQI is transmitted as the portion included in data segment. That is, as for HS-DPCCH, the notification of HS-DPCCH offsets starts as the SHO state of A-DPCH starts, and the notification of HS-DPCCH offsets ends as the SHO state of A-DPCH ends.

Note that, although data, a pilot, a TPC command, and an offset are time-multiplexed according to FIG. 10, they may be IQ multiplexed alternatively.

In this way, the synchronizing of the A-DPCH SHO start/end timing with the start/end timing of HS-DPCCH offset transmission helps to avoid unnecessary HS-DPCCH offset transmission when A-DPCH is not in SHO, and therefore, it is possible to reduce the interferences of HS-DPCCH on other channels. In addition, a reduction in the battery consumption of a communication terminal is achieved.

It should be noted that, notwithstanding the explanation made here with the example of Fast-UL in the present embodiment, its implementations are not limited to such a case; the present invention is applicable to all wireless communication systems in which a dedicated channel to which soft handover applies and another dedicated channel to which hard handover applies run in a existent manner, and the dedicated channel to which hard handover applies runs in uplink and downlink.

As described above, according to the present invention, it is possible to keep the received SIR of HS-DPCCH at the required SIR, which is achieved by performing transmission power control for HS-DPCCH appropriately in a wireless communication system operating in a mixed channel environment involving an SHO-applicable A-DPCH and an HHO-applicable HS-DPCCH.

This specification is based on the Japanese Patent Application No. 2002-239744 filed on Aug. 20, 2002, entire content of which is expressly incorporated by reference herein.

INDUSTRIAL APPLICABILITY

The present invention is applicable to a wireless communication terminal apparatus or a wireless communication base station apparatus used in a mobile communication system.

The invention claimed is:

1. A base station apparatus used in a wireless communication system in which a first dedicated channel to which soft handover applies and a second dedicated channel to which hard handover applies exist, the base station apparatus comprising:

a judgment section that judges whether the first dedicated channel is in a soft handover state or not; and a control section that sets a transmission power of the downlink second dedicated channel at a sum of the transmission power of the downlink first dedicated channel and an offset $\Delta P=\Sigma EPi/P1$, where Pi is a reception power of a pilot channel at a communication terminal apparatus from each base station i to which the first dedicated channel is connected and P1 is a reception power of a pilot channel at the communication terminal apparatus from the base station to which the first dedicated channel and the second dedicated channel are connected, when it is judged by said judgment section that the first dedicated channel is in a soft handover state.

2. A communication terminal apparatus that transmits the offset $\Delta P$ to the base station apparatus according to claim 1, the communication terminal apparatus comprising:

a measurement section that measures the Pi;

a calculation section that calculates the offset $\Delta P$ from the measured Pi; and a transmission section that transmits the calculated offset $\Delta P$. to the base station apparatus according to claim 1 via the second dedicated channel.

3. A transmission power control method used in a wireless communication system in which a first dedicated channel to which soft handover applies and a second dedicated channel to which hard handover applies exist, the method comprising setting a transmission power of the second dedicated channel at a sum of the transmission power of the first dedicated channel and an offset $\Delta P=\Sigma Pi/P1$, where Pi is a reception power of a pilot channel at a communication terminal apparatus from each base station i to which the first dedicated channel is connected and P1 is a reception power of a pilot channel at the communication terminal apparatus from a base station to which the first dedicated channel and the second dedicated channel are connected, when the first dedicated channel is in a soft handover state.

* * * * *